United States Patent Office  2,797,383
Patented June 25, 1957

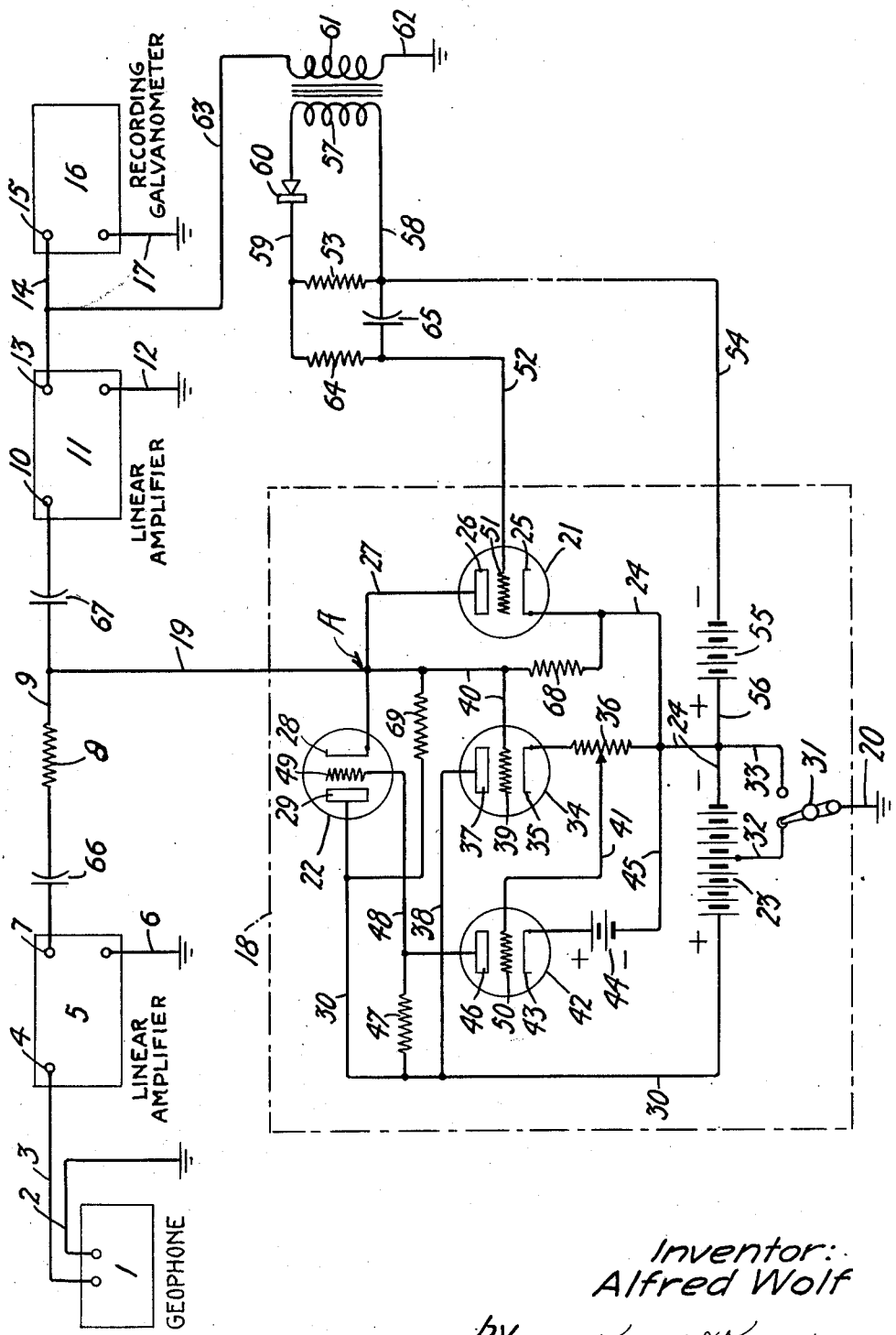

2,797,383

VOLTAGE-RESPONSIVE ELECTRONIC RESISTOR AND APPARATUS USING THE SAME

Alfred Wolf, Tulsa, Okla., assignor to Geophysical Research Corporation, New York, N. Y., a corporation of New Jersey Application June 24, 1954, Serial No. 439,106

7 Claims. (Cl. 323—22)

This invention relates to a voltage-responsive electronic resistor and apparatus using the same. An example of such apparatus is a geophysical exploration seismic amplifier provided with an attenuator using this electronic resistor as the variable leg of a voltage divider with this resistor controlled by automatic volume control voltage obtained usually from the rectified and smoothed amplifier output voltage.

One object of the invention is to provide an electronic resistor which may be varied in resistance from a very high value to a very low value and without incidentally excessively varying the direct current voltage which the electronic resistor necessarily applies to the circuit into which it is incorporated. Attainment of this objective provides an attenuator of unusually great range and which may be used to control the gain of a seismic amplifier without applying direct current pulses to the amplifier as an incident to the operation of the attenuator.

The single figure of the accompanying drawing diagrammatically shows the new electronic resistor applied to seismic amplifier equipment so as to function as an automatic volume control.

In this drawing the geophone 1 which detects the seismic disturbances has one side grounded by a conductor 2 and its other side connected by a conductor 3 with the input terminal 4 of a linear amplifier 5 which may include filters used for seismic work. This linear amplifier is grounded by a conductor 6, its ungrounded output terminal 7 being connected through a resistor 8, of very high resistance, by a conductor 9 with the ungrounded input terminal 10 of a second linear amplifier 11. This may also be of the type used for seismic work and may incorporate the usual seismic filters. The amplifier 11 is grounded by a conductor 12 and its ungrounded output terminal 13 is connected by a conductor 14 to the ungrounded terminal 15 of a recording galvanometer 16 which is grounded by a conductor 17. The present invention is of value when the automatic volume control employed heretofore in seismic amplifiers is inadequate.

The electronic resistor of the present invention is shown boxed by the broken line 18 and is connected to the conductor 9, between the resistor 8 and the terminal 10, by a conductor 19, and to ground by a conductor 20. Thus the resistor is in shunt connection with the linear amplifier 11, and forms the variable leg of a voltage divider, or attenuator, formed by the resistor 8 and the electronic resistor.

The resistor 8 is a fixed value which, in seismic work, may be within the range of from 1 to 5 megohms, for example. The amplifier 11 should, of course, have a very high impedance input as, for example, in the order of from 1 to 20 megohms. For this purpose, the amplifier 11 may be provided with a cathode follower input.

When the electronic resistor has a very high value there is little voltage lost in the resistor 8; when the electronic resistor has a very low value of resistance, a large amount of voltage is lost in the resistor 8. The electronic resistor of the present invention has the advantage that it may range in resistance from a very high value, approaching or even exceeding that of the resistor 8, to a very low value as, for example, in the order from 40 to 100 ohms. When the resistor 8 has a value of 4 megohms, a range of attenuation, at the input terminal 10, of almost 100,000 to 1 can be attained by the use of the invention.

The voltage-responsive variable resistor includes the triode vacuum tubes 21 and 22 which are connected in series with each other in a plate circuit powered by the multiple cell battery 23. The negative end of this battery connects through a conductor 24 with the cathode 25 of the tube 21, the latter's plate 26 connects through a conductor 27 with the cathode 28 of the tube 22 and the latter's plate 29 connects through a conductor 30 with the positive end of the battery 23.

A direct current amplifier having a cathode follower input is provided for controlling the conductance of the tube 22 and this amplifier is itself controlled by the voltage difference between the conductor 27 and the ground 20. The ground 20 connects through a switch 31 with either the center of the battery 23, by way of a conductor 32 or with the negative end of the battery 23, by way of a conductor 33. The conductor 19 connects with the conductor 27 at A, and there may be a direct current voltage applied to the conductor 9. The above direct current amplifier (which amplifies both A. C. and D. C.) has its input connected to A, and hence, responds to any voltage, direct current or signal, which may appear at A.

This direct current amplifier includes a tube 34 having its cathode 35 connected to the conductor 24 through a potentiometer's resistance 36, and its plate 37 is connected by a conductor 38 to the conductor 30. The control grid 39 of the tube 34 is connected by a conductor 40 directly to the conductor 27, the potentiometer's sliding contactor 41 picking a signal from the potentiometer's resistance 36; tube 34 is thus connected as a cathode follower. The resulting high input impedance of the tube 34 prevents any material loading between the conductor 27 (point A) and ground.

The output from the cathode follower connected tube 34 is amplified by a tube 42. The cathode 43 of this tube connects with the positive end of a biasing battery 44 whose negative end connects through a conductor 45 with the conductor 24 which connects with the negative end of the battery 23. The plate 46, of this tube 42, connects with the conductor 30 through a resistor 47, the plate 46 connecting directly through a conductor 48 with the control grid 49 of the tube 22. The grid 50 of the tube 42 connects directly with the sliding contactor 41 of the potentiometer whose resistance 36 is in the cathode to ground circuit of the tube 34.

Control of the electronic resistor is effected through the grid 51 of the tube 21. As illustrated, this grid 51 connects through a conductor 52 with one end of a resistor 64 whose other end connects to one end of resistor 53; the other end of 53 connects through a conductor 54 with the negative end of a battery 55 whose positive end connects with the conductor 24 through a conductor 56. The resistor 53 receives current from the secondary 57 of a transformer, this secondary connecting with the resistor 53 through conductors 58 and 59 and a rectifier 60 which is connected in the conductor 59. The primary 61, of this transformer, has one end grounded at 62 and its other end connected through a conductor 63 with the conductor 14 and, therefore, to the output of the amplifier 11. This arrangement places a direct current voltage on the grid 51 which is dependent on the output of the amplifier 11. This voltage is negative for zero output of 11 but increases with output of 11. The conductor 52 connects with the resistor 53 through a resistor 64, a capacitor 65 being connected so as to form the filter usually used when picking up automatic volume control voltage. This filters out the signal and makes the voltage applied to the grid 51 dependent primarily on signal volume changes.

The tubes 21 and 22 should have characteristics as are identical as is possible. Preferably a single dual triode tube is used. In the actual practice of the present invention dual triodes of the 12AT7 type have been used for all four stages, thus requiring only two tubes and assuring relatively balanced characteristics in the case of the two triode stages represented by the tubes 21 and 22 in the drawing. The plate circuit powering battery 23 may be from a 22½ volt to a 180 volt battery, the biasing battery 44 may have a voltage from about ¼ to ⅓ that of the battery 23, and the biasing battery 55 may have a voltage of from 5 to 10 volts. Using 12AT7 type tubes, the potentiometer resistor 36 may have a value of from 100,000 to 250,000 ohms and the plate load resistor 47 may be of a similar value.

It is to be observed that in the apparatus disclosed there is a voltage difference between the conductor 19 and ground which would be applied to the amplifiers 5 and 11, this being prevented by the use of the blocking capacitors 66 and 67 which reciprocatively couple the amplifier 5 to the resistor 8 and the line 9 to the amplifier 11.

In operation, and assuming that there is little or no signal from the geophone 1, the battery 55 biases the grid 51 so that the tube 21 is almost cut off. The direct current amplifier, formed by the tubes 34 and 42 and their components, are at this time applying a comparable negative bias between the grid 49 and the cathode 28 of the tube 22. This bias is applied by the tube 42 and assumes that the contactor 41 is properly adjusted on the potentiometer's resistance 36.

When the geophone 1 puts out a signal, as by detecting the earth's motion resulting from a shot being fired, the automatic volume control voltage opposes the battery 55 and causes the grid 51 to become less negative with respect to its cathode 25. This makes the tube 21 more conducting and tends to drop the voltage in the conductor 27 (at A). If this occurred the drop would carry through to the amplifier 11 in the form of a pulse which would interfere with the operation of the galvanometer 16. That is to say, the galvanometer would record the pulse as part of the signal.

The above difficulty is prevented because the voltage on the grid 39 of the tube 34 also tends to drop with the result that the bias applied to the grid 49, obtained from the cathode follower connection with the tube 34 and, of course, amplified by the tube 42, correspondingly becomes less negative with respect to its cathode 28 and in the same order as the change occurs in the case of the tube 21. Thus the conductance of the two tubes 21 and 22 remain balanced or substantially balanced at all times, and since the current flowing through the two tubes is the same or almost so, it follows that the voltages across tubes 21 and 22 respectively remain unchanged or substantially so when the signal is applied.

There is some chance that under extreme conditions one or the other of the tubes 21 and 22 might cut off completely. Therefore, a resistor 68 is connected between the conductors 24 and 40, so as to shunt the tube 21, and a resistor 69 is connected between the conductors 40 and 30 so as to shunt the tube 22. Resistors 68 and 69 have equal values. In the case of the types of tubes and circuit values specifically mentioned, these resistors 68 and 69 may each have values of from between 1 to 100 megohms. It is to be understood that these and the other values are dependent on design considerations.

To bring the tubes 21 and 22 into balance, the contactor 41 must be adjusted on the potentiometer's resistance 36. This should be done while a signal is applied to the grid 51 which is sufficient to overcome the bias of the battery 55 to a degree causing appreciable current to flow in the tubes 21 and 22. Then by moving the contactor 41 the two tubes 21 and 22 may be brought to a condition where the same voltage drop appears across each. As long as the tubes are operating above complete cut-off this balance is maintained. In the cut-off condition resistors 68 and 69 maintain a balanced condition. Even in the absence of 68 and 69 an improvement is obtained in that the pulse-like changes in the voltage between the conductor 19 and ground 20 are materially reduced.

The limits of the new electronic resistor are set by the conditions where the tubes 21 and 22 are conductive to their maximum degree and where they are almost cut off. The tube 42 must provide sufficient amplification to apply the necessary bias to the grid 49 of the tube 22.

To illustrate the flexibility of the new apparatus, when the output of the amplifier 11 is substantially zero both of the tubes 21 and 22 are almost cut off so that the resistance between the conductor 19 and the ground 20 may be made greater than the resistance 8 by choosing proper values of 68 and 69. Thus there is practically no resistance shunting the amplifier 11 and since the latter has a high-impedance input the drop of signal voltage in resistor 8 will not be great and substantially the full output of 5 will be applied to 11. As the output from the amplifier 11 goes up the tubes 21 and 22 rapidly become conducting. If the transconductance of the tube 22 is in the neighborhood of 0.0005 mho, and if the amplification obtained by the direct current amplifier, or in other words from the grid 39 of the tube 34 through to the plate 46 of the tube 42, is in the neighborhood of 40, the alternating current resistance between the conductor 19 (point A) and the ground 20 (through tube 22) drops to around 50 ohms. Remembering that the resistor 8 is of very large value, 5 megohms for example, it becomes apparent that the range of attenuation obtained is in the order of 100,000 to 1.

The switch 31 is not necessary. Preferably it is thrown to connect the center of the battery 23 with the ground 20 through the conductor 22. This permits a more exact balancing of the tubes 21 and 22. However, good results are obtained when the switch is thrown so that the extreme negative end of the battery 23 is grounded.

It is to be understood that the electronic resistor described is primarily adapted to handle alternating current. The resistance is provided through the tubes 21 and 22 between the conductor 19 and the ground 20. (But it is tube 22 which shows the very low impedance between point A and ground.)

I claim:

1. A voltage-responsive variable electronic resistor including a pair of vacuum tubes each having a cathode and a grid and a plate, a direct current supply means connected to the cathode of one tube and to the plate of the other tube so as to charge them negative and positive, respectively, the remaining plate and cathode being interconnected so that the two tubes are in series in a common plate circuit, a first terminal of said resistor connected between the supply-connected cathode and plate, and a second terminal of said resistor connected between the remaining cathode and plate, means for applying a control voltage to the grid of one tube so as to control its conductivity, and a high-impedance input direct current amplifier having its input connected to the cathode and plate of said controlled tube and its output connected to the first terminal and the grid of the other tube so as to vary the latter's conductivity in substantially the same order and amount as is the controlled tube by said control voltage.

2. A voltage-responsive variable electronic resistor including a pair of vacuum tubes each having a cathode and a grid and a plate, a direct current supply means connected to the cathode of one tube and to the plate of the other tube so as to charge them negative and positive, respectively, the remaining plate and cathode being interconnected so that the two tubes are in series in a common plate circuit, a first terminal of said resistor connected between the supply-connected cathode and plate, and a second terminal of said resistor connected between the remaining cathode and plate, means for applying a control voltage to the grid of one tube so as to control its conductivity, and a high-impedance input direct current amplifier having its input connected to the cathode and plate of said controlled tube and its output connected to the first terminal and the grid of the other tube so as to vary the latter's conductivity in substantially the same order and amount as is the controlled tube by said control voltage, said direct current amplifier having means for controlling its gain so that the relative voltage drops through the two tubes may be adjusted.

3. A voltage-responsive variable electronic resistor including a pair of vacuum tubes each having a cathode and a grid and a plate, a direct current supply means connected to the cathode of one tube and to the plate of the other tube so as to charge them negative and positive, respectively, said supply means comprising a plurality of sources connected in series, the remaining plate and cathode being interconnected so that the two tubes are in series in a common plate circuit, a first terminal of said resistor connected to an intermediate one of said sources, and a second terminal of said resistor connected between said remaining cathode and plate so that said resistor divides through said sources as well as the two tubes, means for applying a control voltage to the grid of one tube so as to control its conductivity, and a high-impedance input direct current amplifier having its input connected to the cathode and plate of said controlled tube and its output connected to the first terminal and the grid of the other tube so as to vary the latter's conductivity in substantially the same order and amount as is the controlled tube by said control voltage.

4. A voltage-responsive variable electronic resistor including a pair of vacuum tubes each having a cathode and a grid and a plate, a conductor connecting the plate of one tube to the cathode of the other, a plate-circuit multicell battery having negative and positive terminals respectively connected to the other cathode and to the other plate, a bias battery having negative and positive terminals, the latter positive terminal being connected to the cathode connected to the plate circuit battery and the bias battery's negative terminal being connected to the grid of the tube having this cathode, means for applying a control voltage to this biased grid and cathode in opposition to the voltage of the bias battery so as to control the conductivity between this cathode and grid, third and fourth vacuum tubes each having a cathode and a grid and a plate, the third tube's plate being connected to the plate of the unbiased tube of said pair of tubes and its grid being connected to the biased tube's plate, a potentiometer's resistance connected in series between the third tube's cathode and the biased tube's cathode, a second bias battery having positive and negative terminals and having its negative terminal connected to the biased tube's cathode and its positive terminal connected to the fourth tube's cathode, a moving contactor for said potentiometer's resistance and connected to the fourth's tube's grid, the fourth tube's plate being connected to the grid of the one of said pair of tubes which is unbiased by the first named bias battery, a plate load resistor connected in series between the fourth tube's plate and the positive terminal of said plate circuit battery, and means for forming the electronic resistor circuit so that it divides through said pair of tubes.

5. A voltage-responsive variable electronic resistor including a pair of vacuum tubes each having a cathode and a grid and a plate, a conductor connecting the plate of one tube to the cathode of the other, a plate-circuit multicell battery having negative and positive terminals respectively connected to the other cathode and to the other plate, a bias battery having negative and positive terminals, the latter positive terminal being connected to the cathode connected to the plate circuit battery and the bias battery's negative terminal being connected to the grid of the tube having this cathode, means for applying a control voltage to this biased grid and cathode in opposition to the voltage of the bias battery so as to control the conductivity between this cathode and grid, third and fourth vacuum tubes each having a cathode and a grid and a plate, the third tube's plate being connected to the plate of the unbiased tube of said pair of tubes and its grid being connected to the biased tube's plate, a potentiometer's resistance connected in series between the third tube's cathode and the biased tube's cathode, a second bias battery having positive and negative terminals and having its negative terminal connected to the biased tube's cathode and its positive terminal connected to the fourth tube's cathode, a moving contactor for said potentiometer's resistance and connected to the fourth tube's grid, the fourth tube's plate being connected to the grid of the one of said pair of tubes which is unbiased by the first named bias battery, a plate load resistor connected in series between the fourth tube's plate and the positive terminal of said plate circuit battery, and means for forming the electronic resistor circuit so that it divides through said pair of tubes, the last-named means comprising a connection to said other and interconnected plate and cathode of said pair of tubes and to a substantially central cell of said plate circuit battery.

6. An electronic circuit adapted to be used as a voltage responsive variable electronic resistor between a first terminal and a second terminal, including a pair of vacuum tubes, each having a cathode and a grid and a plate, the first of said tubes having its plate connected to the first of said terminals, the second of said tubes having its cathode connected to the same terminal, a plate circuit voltage supply connected to the second of said terminals, and having its negative pole connected to the cathode of said first tube, and its positive pole connected to the plate of said second tube, means for applying control voltage between the grid and cathode of said first tube so as to vary the current in both of said tubes, and a high input impedance direct current amplifier with its input connected between said two terminals, and its output connected between the second of said terminals and the grid of said second tube so as to apply substantially the same voltage between the grid and cathode of the second tube as is applied by said control voltage between the grid and cathode of said first tube.

7. A voltage responsive electronic resistor including a first and a second vacuum tube, each having a cathode and a grid and a plate, a conductor connecting the plate of the first of said tubes to the cathode of the second, a plate circuit voltage source having its negative pole connected to the cathode of the first tube and its positive pole to the plate of the second tube, means for applying control voltage to the grid of said first tube, and a high input impedance direct current amplifier having its input connected between the cathode and plate of said controlled tube and its output connected between the cathode of said controlled tube and the grid of the other tube, so as to apply substantially the same voltage between the latter's grid and cathode as is applied by the control voltage between the grid and cathode of the controlled tube.

References Cited in the file of this patent
UNITED STATES PATENTS

| | | |
|---|---|---|
| 2,247,468 | Barr et al. | July 1, 1948 |
| 2,467,624 | Loper | Apr. 19, 1949 |
| 2,679,626 | Miller | May 25, 1954 |